United States Patent [19]

James et al.

[11] Patent Number: 4,815,693

[45] Date of Patent: Mar. 28, 1989

[54] VALVE WITH ACTUATING HANDLE OPERABLE IN DIFFERENT QUADRANTS

[75] Inventors: Bruce James, Oakville; Leslie Calder, Mississauga, both of Canada

[73] Assignee: Lunkenheimer Tubecraft Canada Ltd., Etobicoke, Canada

[21] Appl. No.: 192,708

[22] Filed: May 11, 1988

[51] Int. Cl.[4] ..................... F16K 35/00; F16K 31/60; F16K 31/143

[52] U.S. Cl. ........................ 251/14; 251/90; 251/95; 251/109; 251/285; 251/286; 251/305

[58] Field of Search ................ 251/14, 90, 95, 98, 251/99, 101, 102, 103, 104, 105, 106, 107, 109, 285, 286, 288, 292, 305, 291

[56] References Cited

U.S. PATENT DOCUMENTS

| | | | |
|---|---|---|---|
| 914,209 | 3/1909 | Watson | 251/285 |
| 1,104,918 | 7/1914 | Mouat | 251/285 |
| 3,228,415 | 1/1966 | Geiss | 251/101 |
| 3,311,128 | 3/1967 | Taylor | 251/98 |
| 3,329,394 | 7/1967 | Overbaugh | 251/99 |
| 3,355,141 | 11/1967 | Cooper | 251/101 |
| 3,537,473 | 11/1970 | DeZurik, Jr. | 251/101 |
| 3,921,955 | 11/1975 | Haddad, Jr. | 251/305 |
| 4,100,816 | 7/1978 | Clark | 251/14 |
| 4,162,782 | 7/1979 | Wilkins | 251/305 |
| 4,570,901 | 2/1986 | Holtgraver | 251/98 |

FOREIGN PATENT DOCUMENTS

| | | | |
|---|---|---|---|
| 0021885 | 1/1981 | France | 251/98 |
| 1237994 | 7/1971 | United Kingdom | 251/285 |
| 1305657 | 2/1973 | United Kingdom | 251/285 |
| 2032579 | 5/1980 | United Kingdom | 251/99 |

Primary Examiner—George L. Walton
Attorney, Agent, or Firm—Sim & McBurney

[57] ABSTRACT

A valve has a housing to which a 360 degree notch plate is integrally connected. A valve member mounted within the housing control fluid flows and rotates though substantially 90 degrees between maximally open and closed positions. A valve stem extends upwardly from the valve and through an opening formed in the notch plate. A handle is releasably secured to the valve stem immediately above the notch plate and has a spring-biased pivoting arm which cooperates with the notches to permit the angular position of the handle and consequently the valve member to be incrementally adjusted and locked. The upper surface of the notch plate has four distinct quadrants, and a number of holes formed at predetermined locations, a different pair of holes being associated with and positioned to either side of each quadrant. The valve stem is shaped to receive the handle in only predetermined angular orientations relative to the valve member. The predetermined angular orientations and the location of the holes are such that, with the handle located in any selected quadrant and the stops located in the pair of holes associated with the selected quadrant, the valve member is fully open when the handle abuts one stop is closed when the handle abuts the other stop.

15 Claims, 4 Drawing Sheets

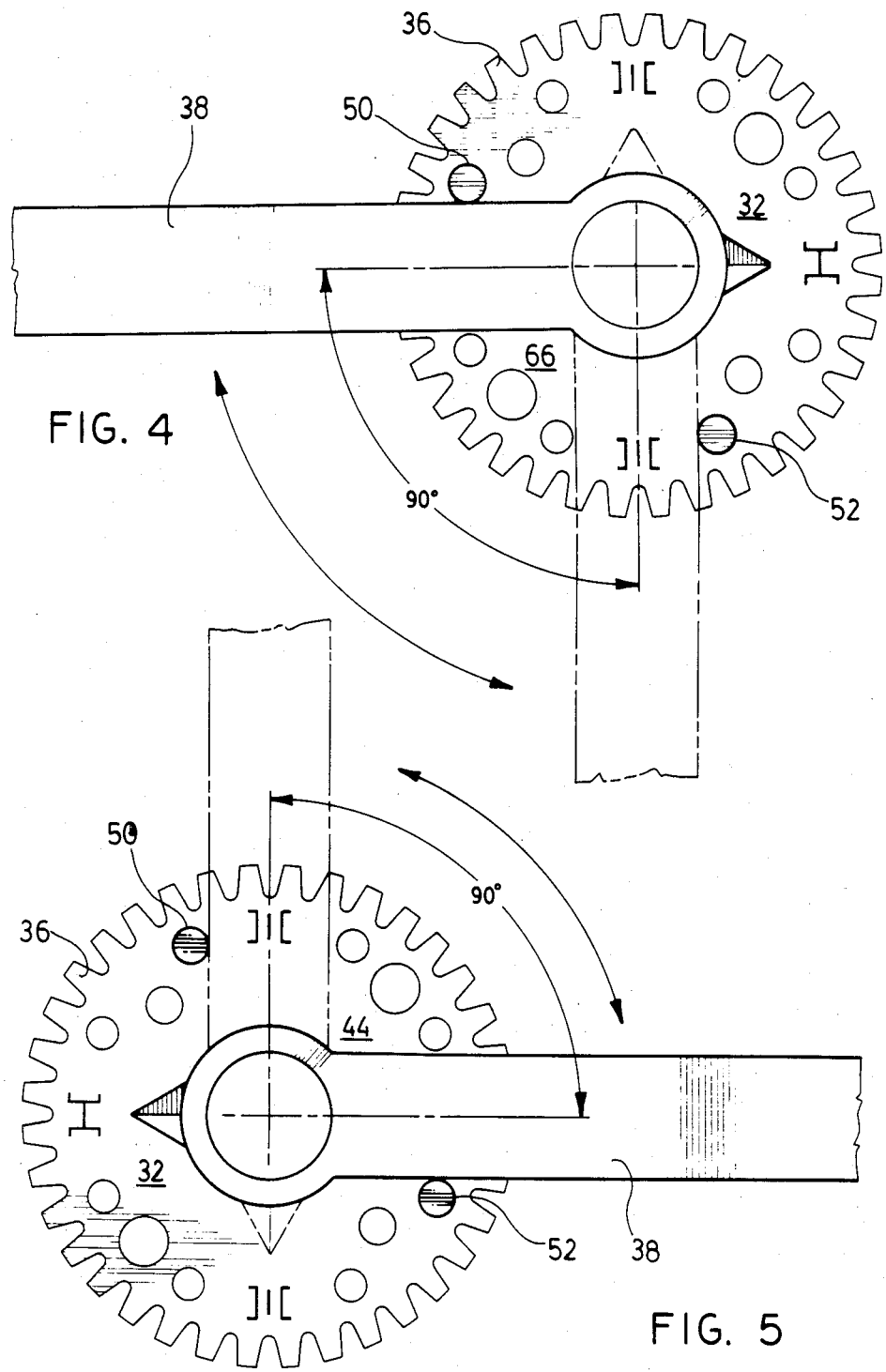

VALVE WITH ACTUATING HANDLE OPERABLE IN DIFFERENT QUADRANTS

FIELD OF THE INVENTION

The invention relates generally to valves for controlling fluid flows, and more specifically, though not exclusively, to valves appropriate for use in the food and beverage industries.

BACKGROUND OF THE INVENTION

It is common to use butterfly valves in the food and beverage industries to control fluid flows. These valves generally comprise a disk-shaped valve member which rotates in the fluid flow path defined by the valve housing. A handle is attached to a valve stem extending from the valve member and externally of the housing. An operator can rotate the handle to adjust the angular orientation of the valve member and consequently flow rates.

To permit incremental changes in flow rates, it is common to provide such a valve with a 90-degree notch plate. According to conventional practice, the notch plate is essentially an add-on feature which is bolted to a circular flange normally formed with the valve housing and surrounding an exposed end of the valve stem. The notch plate will normally have a part-circular peripheral track extending beyond the flange and formed with regularly spaced-apart notches. A handle formed with a spring-biased mechanism carrying a V-shaped projection cooperates with the notches to permit the handle and consequently the valve member to be rotated in discrete increments and locked in any particular angular position. The notched periphery will normally span a 90 degree sector or arc, which is sufficient to encompass fully open and closed states of the valve.

It is important for an operator to have a positive indication that the valve is either fully open or closed. To that end, portions of the notch plate are commonly bent to positions perpendicular to the general plane of the plate to define a pair of stops at either end of its notched track. This arrangement normally provides for the valve to be fully open when the handle strikes one stop and fully closed when the handle strikes the other stop.

A problem associated with such prior valves is that the handle is confined to a particular range of positions relative to the valve housing. If additional liquid lines must be installed proximate to the line in which the valve is located, or the valve is to be installed in confined surroundings, it can be difficult to orient the handle to provide its required range of movement.

SUMMARY OF THE INVENTION

In one aspect, the invention provides a valve having a housing, a valve member, and a valve stem attached to the valve member and having an end portion extending externally over the housing. The valve member and valve stem are mounted for rotation about a predetermined rotational axis, the valve member being rotatable through substantially 90 degrees between a fully open orientation which permits maximum fluid flow through the valve and a close orientation. A member attached to the housing defines a surface substantially perpendicular to the rotational axis, the surface having four 90 degree quadrants centred about the rotational axis. The valve stem end portion extends through the surface, and a handle can be releasably attached to the valve stem end portion to permit rotation of the valve member. A pair of stop members are provides, and means associated with the surface-defining member serve to releaseably receive the stop members at predetermined locations at the surface, a different pair of predetermined locations being associated with each quadrant. The valve stem end portion is associated with means which orient the handle in predetermined angular orientations relative to the valve member. These angular orientation and the predetermined locations are so select that, when the handle is attached to the valve stem end portion and located above any selected one of the four quadrants, and when the pair of stop members are retained at the pair of predetermined locations associated with the selected quadrant, the valve member is in the fully open orientation when the handle abuts one of the stop members and the valve member is in the closed orientation when the handle abuts the other of the stop members. Accordingly, the handle can be oriented in any one of the four quadrants, as desired, and rotated through a range of movement which includes fully open and closed states of the valve, abutment of the handle against stop members providing an operator with a very positive indication of fully open and closed valve states.

In another aspect, the invention provides a valve mechanism with essentially a 360-degree notch plate, in which a valve actuating handle can be oriented in any one of four quadrants associated with the notch plate and in which positive stops are associated with the selected quadrant to indicate to an operator when the valve is fully open or closed.

Other aspects of the invention will be described below in connection with a preferred embodiment and will be more specifically defined in the appended claims.

DESCRIPTION OF THE DRAWINGS

The invention will be better understood with reference to drawings illustrating a preferred embodiment in which:

FIG. 4 is a plan view of the notch plate showing a valve-operating handle in a first quadrant of the notch plate and handle positions corresponding to fully open and closed states of the valve;

FIG. 5 is a view similar to that of FIG. 4 illustrating the handle oriented in a diametrically-opposing quadrant of the notch plate and handle positions corresponding; and, FIG. 6 shows the valve in conjunction with an optional automatic actuator.

DESCRIPTION OF PREFERRED EMBODIMENTS

Figure 1:
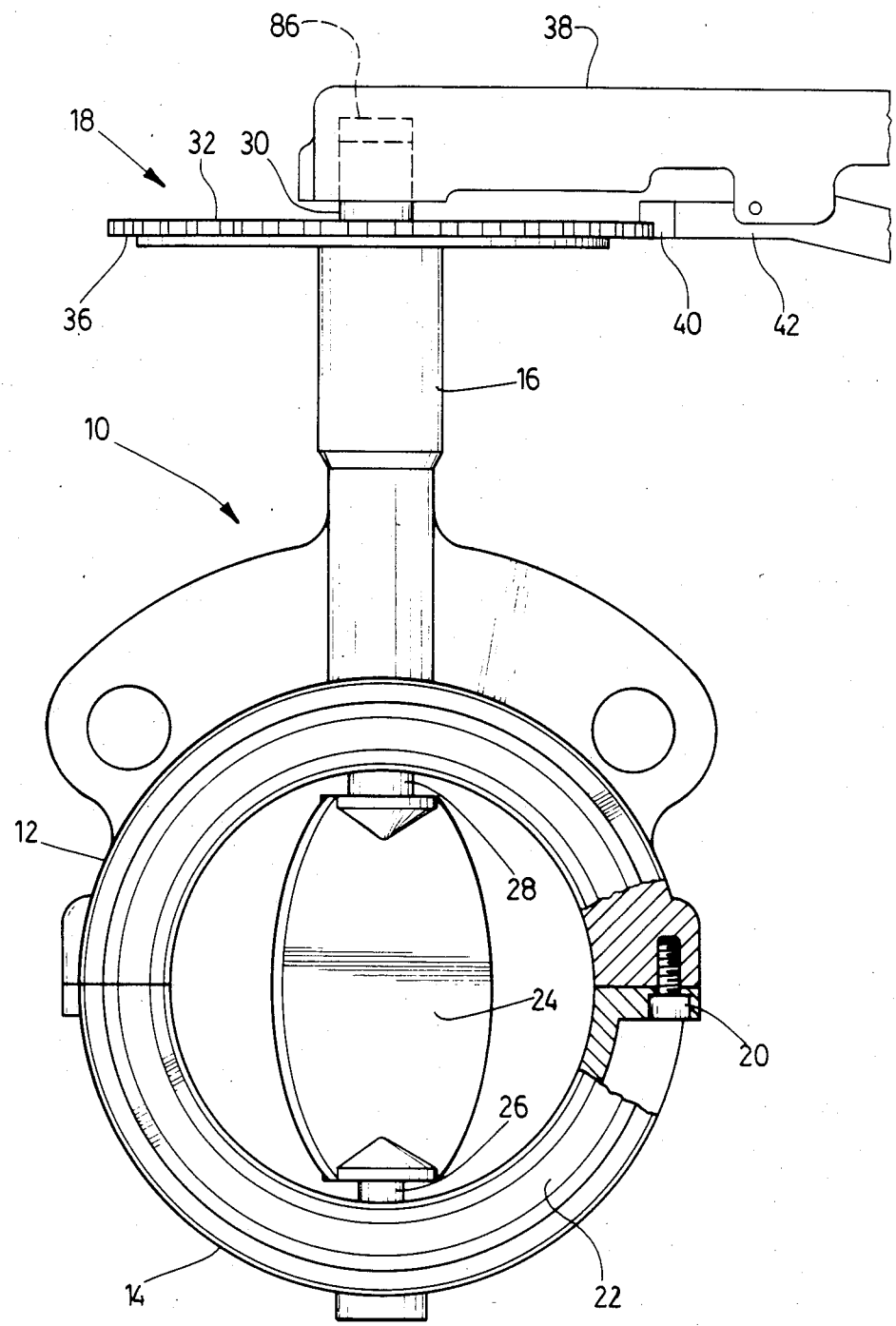
FIG. 1 is an elevational view of a valve embodying the invention, partially fragmented.

Reference is made to FIG. 1 which provides an overall view of a preferred embodiment of a valve 10 constructed according to the invention. The valve 10 has a housing formed in separable upper and lower portions 12, 14. The upper housing portion 12 is integrally cast with a valve stem housing 16 and with a 360 degree notch plate 18. The upper and lower housing portions 12, 14 can be bolted together (only bolt 20 shown in FIG. 1), to define a valve compartment and a cylindrical flow path extending through the valve compartment. Annular seating surfaces on opposing side of the valve housing (only one seating surface 22 apparent in FIG. 1) accommodate pipes which would be connected to opposing sides of the valve 10.

A generally disk-shaped valve member 24 is mounted for rotation within the valve compartment. the valve member 24 has a circular shaft 26 which extends downwardly and fits into a cylindrical recess (apparent in FIG. 6, but not specifically indicated) formed in the interior of the lowering housing portion 14. A valve stem 28 is integrally connected to the upper end of the valve member 24 and extends upwardly through the valve stem housing 16. An upper end portion 30 of the valve stem 28 extends externally of the housing points above the upper surface 32 of the notch plate 18. Mounting of the shaft 26 in the housing recess and of the valve stem 28 in the valve stem housing 16 permits rotation of the valve member 24 and stem about a vertical rotation axis extending longitudinally and centrally through the valve stem 28. Although not specifically indicated, the rotational axis is centrally located in the view of FIG. 2, where various axes may be seen to intersect or radiate from the rotational axis. An annular rubber seal mounted centrally in the valve housing defines seating surfaces for the valve member 24 in its closed orientation, but has not been illustrated. These aspects of the valve 10 are conventional (except for the 360 degree notch plate 18 and the integral forming of the notch plate 18 with the upper housing portion 12) and details of construction and operation will be readily understood by those skilled in the art.

In use, the valve member 24 would have roughly 180 degrees of freedom of rotation. Those familiar with butterfly valves of this general type will be aware that such a limit is imposed by the rubber seal which is ultimately installed in the interior of the valve 10 to define a sealing surface for the valve member 24 in its closed orientation. It will be apparent, however, that rotation through roughly 90 degrees is sufficient to move the valve member 24 between a fully-open orientation in which maximum fluid flows are possible and a closed orientation in which the fluid path is closed. The orientation of the valve member 24 in the housing is normally apparent, even after assembly and installation in a fluid line, from two flat parallel surfaces 34 formed on the valve stem end portion 30, which surfaces are substantially parallel to the general plane of the valve member 24. When the two surfaces are in-line with the flow channel, the valve 10 is in a fully open state. When the two surfaces are perpendicular to the flow channel, the valve 10 is fully closed. According to one aspect of the present invention, however, another arrangement, described more fully below, is used to indicate the state of the valve 10 during manual operation of the valve 10.

Figure 2:
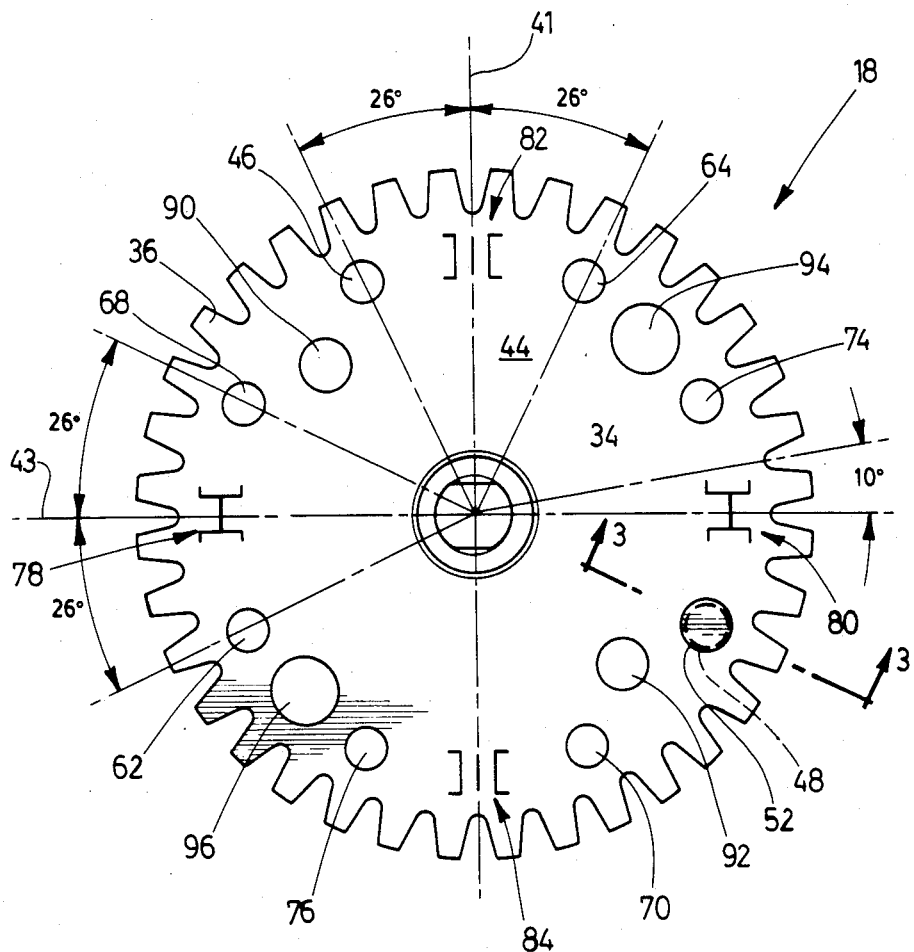
FIG. 2 is a plan view from above of a 360 degree notch plate associated with the valve.
Figure 3:
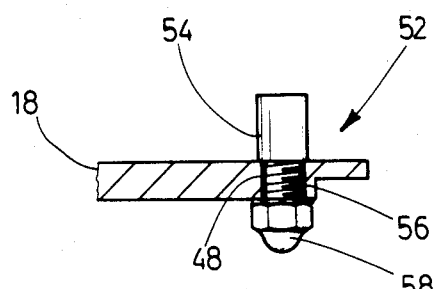
FIG. 3 is a view along lines 3—3 of FIG. 2 detailing the construction of a removable stop member.

The 360 degree notch plate 18 is detailed in FIGS. 1-3. It has a generally circular peripheral portion 36 formed with notches that are equally-spaced circumferentially by 10 degree increments. A handle 38 mounts on the valve stem end portion 30 immediately abov the upper surface 32 of the notch plate 18. The handle 38 permits an operator to rotate the valve stem 28 and valve member 25 by hand to vary the operating state of the valve 10. This is a standard handle used in connection with prior notch plate mechanisms, and has a V-shaped tip 40 formed on a forward end of an arm 42 that is pivoted to the handle 38. When the handle 38 is attached to the valve stem end portion 30, the V-shaped tip 40 can lodge in any one of the notches to fix the position of the handle 38 relative to the valve housing and consequently to fix the state of the valve 10. The arm 42 is spring-biased (biasing spring not illustrated) to remain in a locked position to prevent handle rotation, but can be released by hand to move the handle 38 incrementally to adjacent notches thereby permitting the valve member 24 to be opened and closed in predetermined incremental amounts.

The upper surface 32 of the notch plate 18 is effectively divided into four quadrants centered on the rotational axis of the valve stem 28. These quadrants are defined in the drawing of FIG. 2 by mutually perpendicular axes 41, 43. Eight open-ended circular holes of uniform size are formed in the notch plate 18 at a commom radius and at predetermined locations. Each quadrant is associated with a different pair of the holes. For example, the upper right hand quandrant 44 is associated with the holes 46, 48 (the hole 48 being illustrated in phantom outline in FIG. 2). These are positioned a predeteremined circumferential distance outwadly to either side of the upper right hand quadrant 44. In this embodiment of the invention, the annular spacing of holes from the edges of the quadrant is about 26 degrees.

Each of the holes can releasably receive and retain one of a pair of stop members 50, 52. The stop member 52 is typical and is shown in FIGS. 2 and 3 mounted in the hole 48. The stop member 52 comprises a circular post 54 whose cross-sectional diameter exceeds that of the hole 48, a threaded shaft 56 attached to the post 54 and dimensioned for insertion through the hole 48 and a crown nut 58 which threads onto the shaft 56 to releasably retain the stop member 52 at the hole 48. The upper left hand quadrant 60 has an identical relationship with two of the holes 62, 64; the lower left hand quandrant 66 with two holes 68, 70; and the lower right hand quadrant 72 with two holes 74, 76. Any one of the holes can releasably receive one of the pair of stop members 50, 52 with the associated post extending outwardly relative to the notch plate surface 32.

The upper surface 32 of the notch plate 18 is formed with indicia to indicate four handle positions. These handle positions are equally-spaced circumferentially and are observed when the handle 38 is attached to the valve stem 28 for rotation. A first pair of 180 degree spaced-apart handle positions 78, 80 correspond to the valve member 24 being in a closed orientation. A second pair of 180 degree spaced apart handle positions 82, 84 each corresponding to the valve member 24 being in a fully open orientation. The indicia indicating the valve positions are international symbols representing open and closed valve states. Each quadrant may be seen to extend between one of the first pair of handle positions 78, 80 and one of the second pair of handle positions 82, 84 so that each quadrant is associated with handle positions corresponding to fully open and closed valve states.

The correspondence between the indicated handle positions and the orientations of the valve member 24 is contrained by the parallel flat surfaces 34 formed on the valve stem end portion 30. These surfaces 34 are received in a recess 86 of shape corresponding to the valve stem end portion, particularly the flats 34, and formed internally of the handle 38. The flats 34 consequently ensure that the handle 38 is attached to the valve stem 28 only in two predetermined angular orientations relative to the valve member 24. in this particular embodiment of the invention, the angular orientations are rotated 180 degrees relative to the one other and involve the axis of the handle 38 being parallel to the general plane of the valve member 24.

The handle 38 can be oriented in any one of the four quadrants, and when so oriented, can rotate the valve member 24 between its fully-open and closed orientations. In FIG. 5, the handle 38 is shown positioned in the upper right hand quadrant 44 of the notch plate surface 32. The stop members 50, 52 are shown retained in the pair of holes 46, 48 associated with the select quadrant. Because the falts 34 associated with the valve stem end portion 30 constrain the handle 38 to align with the general plane of the valve member 24, and because of the position of the stops 50, 52, the extremes of handle 38 movement in the selected quadrant correspond to maximally open and closed states of the valve 10. In particular, when the handle 38 is abutted against the stop member 52, in the orientation shown in solid lines in FIG. 5, the valve member 24 in its closed orientation. The handle 38 can be rotated through 90 degrees from that position and abutted against the other stop member 50 in the handle orientation illustrated in phantom outline in FIG. 5 to orient the valve member 24 in its fully-open orientation. The cooperation between the stop members 50, 52 and the handle 38 provides the operator with a very positive indication of the fully-opened and closed valve states. The spacing of the holes 46, 48 from the sides or edges of the upper right hand quadrant 44 is determined largely by the dimensions of the handle 38 (specifically the circumferential width as measured at the radius of the holes). The angle of 26 degrees between each hole and the axes bounding the quadrant 44 is selected such that the handle can rotate through 90 degrees when positioned in the quadrant 44, the angular rotation necessary to move the valve member 24 between its fully-open and closed orientations. The paired holes associated with each quadrant observe the same relationship. The relevant angle formed between the holes and the quadrants will change according to the nature of the handle used, specifically with the handle circumferential dimension at the radius at which the holes are positioned relative to the rotational axis.

In FIG. 4, the handle 38 is shown positioned over the lower left hand quandrant 66. The stop members 50, 52 are shown retained in the pair of holes 68, 70 associated with the selected quandrant. When the handle 38 is abutted against the stop member 50 in the orientation shown in solid outline, the valve member 24 is in its closed orientation. When the handle 38 is rotated through 90 degrees and abutted against the other stop member 52, in the handle orientation illustrated in phantom outline in FIG. 4, the valve member 24 in its fully-open orientation.

It will be apparent that an operator can select any one of the four quadrants in which to locate the handle 38. The pair of stop members 50, 52 will be placed in the pair of holes associated with the selected quadrant. The handle 38 can be rotated through a range of movement of about 90 degrees, limited by the stop members 50, 52. Abutting the handle 38 against one stop member will orient the valve member 24 in its maximally-open orientation; abutting the handle 38 against the other stop member will locate the valve member 24 in its closed orientation. Indicia formed on the notch plate surface 32 indicate the relevant handle positions corresponding between fully open and closed states of the valve in any selected quadrant. Intermediate the two extreme positions, the operator can orient the V-tip 40 associated with the handle 38 in any one of the notches in the 90 degree section of the notch plate periphery enclosed by the selected quadrant to select and fix an intermediate state of the valve member 24.

An important aspect of the valve 10 is the provision of open-ended holes in the notch plate 18. In sanitary applications, it is undesirable to provide any recess or structure which permits accumulation of debris. Although recesses and other arrangements might be considered to locate the stop members 50, 52 at predetermined locations relative to each quadrant for the broad purposes of the invention, the use of open-ended holes is particularly advantageous, permitting thorough cleansing of the valve 10.

Figure 6:
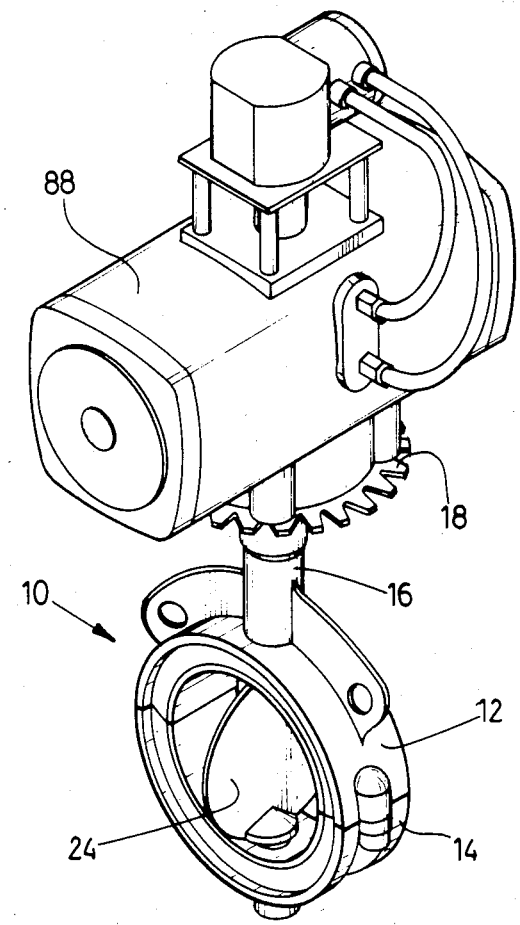

The valve 10 is adapted for operation either by means of the handle 38 or by means of an automatic actuator, such as the pneumatic actuator 88 illustrated in FIG. 6. Prior notch plate arrangements have not permitted such convenient optional operation. In the present device, the notch plate 18 is integrally formed with the housing, which permits a set of unobstructed open-ended holes of predetermined size and relative spacing to be formed in the notch plate 18. for example, one additional pair of holes 90, 92 are sized and spaced according to standards set by the International Standards Organization (ISO) to conform to standard spacing of fasteners associated with a pneumatic actuator. This permits the actuator 88 to be threadedly mounted with appropriate holes and nuts by means of the holes 90, 92. Another pair of holes 94, 96 of different size and relative spacing are provided to accommodate actuators not conforming to ISO specifications. the combination of an integrally formed notch plate 18 permitting exposed clearance holes according to ISO or other standards and the provision of removable stop members 50, 52, permits the valve 10 to be used immediately by means of handle actuator or by means of a pneumatic actuator as illustrated.

In the preferred embodiment, the valve stem end portion 30 has been formed with flats 34 for purposes of constraining predetermined angular relationships between the handle 38 and the valve member 24. Such means for orienting the handle 38 have been selected largely for two reasons: first, a standard notch-plate handles can be used; second, the arrangement of flats 34 on either side of the valve stem end portion 30 is appropriate for receipt of conventional pneumatic actuators. Other shapes and means for securing a handle 38 to the valve stem end portion 30 are within the ambit of the present invention. In particular, it is not critical that the handle 38 be aligned with the general plane of the valve member 24. If, for example, the handle 38 were inclined at 45 degrees relative to the general plane of the valve member 24, the positions of the various stop-receiving apertures associated with the notch plates, the indicia indicating handle positions corresponding to fully open and closed valve states and the four quadrants would effectively require rotation through 45 degrees on the notch plate 18 to ensure that the valve 10 is in fully-open and closed states when the handle 38 abuts the stops.

It will be appreciated that a particular embodiment of the invention has been described to illustrate the principles associated with the inventon and that modifications may be made therein without departing from the spirit of the invention or necessarily departing from the scope of the appended claims.

We claim:

1. A valve comprising:
   a housing having an internal fluid flow path;
   a valve member in the fluid flow path;
   a valve stem attached to the valve member, the valve stem having an end portion extending externally of the housing;
   means mounting the valve member and the valve stem to the housing for rotation about a predetermined rotational axis extending longitudinally through the valve stem, the valve member being rotatable through about ninety degrees between a fully open orientation in which the valve member permits maximum fluid flow along the fluid flow path and a closed orientation in which the valve member closes the fluid flow path;
   a member attached to the housing and defining a surface substantially perpendicular to the rotational axis, the surface having four 90-degree quadrants centered on the rotational axis, the valve stem end portion extending through the surface;
   a handle releasably attachable to the valve stem end portion above the surface to permit rotation of the valve stem and valve member about the rotational axis;
   a pair of stop memebers;
   means associated with the surface-defining member for releasably receiving the stop members at predetermined locations at the surface, a different pair of the predetermined locations being associated with each of the quadrants, the pair of locations being positioned to either side of the associated guadrant and in diametrically opposite guadrants;
   the valve stem end portion having means for orienting the handle in predetermined angular orientations relative to the valve member, the predetermined angular orientations and the predetermined locations being so selected that, when the handle is attached to the valve stem end portion and location above any selected one of the four quadrants and the pair of stop members are retained at the pair of predetermined locations associated with the selected quadrant, the valve member is in the fully open orientation when the handle abuts one of the stop members and the valve member is in the closed orientation when the handle abuts the other of the stop members.

2. A valve as claimed in claim 1 in which the pair of predetermined locations associated with each quadrant are circumferentially outside of the associated quadrant by a predetermined circumferential distance determined by the dimensions of the handle.

3. A valve as claimed in claim 1 comprising indicia on the surface indicating four handle positions equally-spaced circumferentially relative to the surface, the indicia identifying among the four handle positions a first pair of 180-degree spaced-apart handle positions each corresponding to the fully open orientation of the valve member and a second pair of 180-degree spaced-apart opposing handle positions each corresponding to the closed orientation of the valve member, each of the four quadrant extending substantially between one of the first pair of handle positions and one of the second pair of handle positions.

4. A valve as claimed in claim 1 in which the surface-defining member has a genreally circular peripheral edge portion formed with a multiplicty of circumferentially spaced-apart notches extending through about 360 degrees about the peripheral edge portion and in which the handle comprises means cooperating with the notches for releasably locating the handle at incrementally and circumferentially spaced-apart positions about the peripheral edge portion when the handle is attached to the valve stem end portion.

5. A valve as claimed in claim 1 in which the stop member receiving means comprise a hole of predetermined size at each of the predetermined locations extending fully through the surface-defining member.

6. A valve as claimed in claim 5 in which each of the stop members comprises a post portion having a cross-sectional dimension exceeding that of the holes, a threaded shaft attached to the post portion and dimensioned to extend through the holes, and a nut which threads onto the shaft.

7. A valve as claimed in claim 5 adapted to be operated alternatively by means of the handle or by means of an automatic actuator, the surface-defining member being integrally connected to the housing and formed with an additional set of open-ended holes of predetermined size and relative spacing, the size and spacing being selected such that the automatic actuator can be secured with threaded fasteners to the surface in engagement with the valve stem end portion.

8. A valve as claimed in claim 5 adapted to be operated alternatively by means of the handle or by means of an automatic actuator, the surface-defining member being integrally connected to the housing and formed with an additional set of open-ended holes of predetermined size and relative spacing, the automatic actuator being threadedly secured through the additional holes to the surface-defining member and engaged with the valve stem end portion.

9. A valve as claimed in claim 1 in which the means associated with the valve stem end portion for orienting the handle comprise a pair of flat parallel surfaces forme don the valve stem end portion and oriented substantially parallel to the general plane of the valve member.

10. A valve comprising:
    a housing having a internal fluid flow path;
    a valve member in the fluid flow path;
    a valve stem attached to the valve member, the valve stem having an end portion extending externally of the housing;
    means mounting the valve member and the valve stem to the housing for rotation about a predetermined rotational axis extending longitudinally through the valve stem, the valve member being rotatable through about ninety degrees between a fully open orientation in which the valve member permits maximum fluid flow along the fluid flow path and a closed orientation in which the valve member closes the fluid flow path;
    a member attached to the housing and defining a surface substantially perpendicular to the rotational axis, the surface having four 90-degree quadrants centered on the rotational axis, the valve stem portion extending though the surface, the surface-defining member having a generally circular peripheral edge portion formed with a multiplicity of circumferentially spaced-apart notches extending through 360 degrees about the peripheral edge portion;
    a handle releasable attachable to valve stem end portion above the surface to permit rotation of the valve stem and valve member about the rotational axis, the handle having means cooperating with the notches for releasably fixing the handle at incrementally and circumferentially spaced-apart positions about the peripheral edge portion when the handle is attached to the valve stem end portion;

a pair of stop members;

a multiplicity of open-ended holes formed in the surface-defining member at a predetermined locations at the surface, a different pair of the multiplicity of holes being associated with each of the quadrants and positioned circumferentially to either side of the associated quadrant and in diametrically opposite quadrants;

each of the stop members being associated with means for releasably securing the stop member in any one of the multiplicity of holes such that the stop member projects outwardly from the surface;

the valve stem end portion having means for orienting the handle in predetermined angular orientation relative to the valve member, the predetermined angular orientations and the predetermined locations being so selected that, when the handle is attached to the valve stem end portion and located above any selected one of the four quadrants and the pair of stop members are retained at the pair of predetermined locations associated with the selected quadrant, the valve member is in the fully open orientation when the handle abuts one of the stop members and the valve member is in the closed orientation when the handle abuts the other of the stop members.

11. A valve as claimed in claim 10 comprising indicia on the surface indicating four handle positions equally-spaced circumferentially relative to the surface, the indicia identifying among the four handle positions a first pair of 180-degree spaced-apart handle positions each corresponding to the fully open orientation of the valve member and a second pair of 180-degree spaced-apart opposing handle positions each corresponding to the closed orientation of the valve member, each of the four quadrants extending between one of the first pair of handle positions and one of the second pair of handle positions.

12. A valve as claimed in claim 10 in which each of the stop members comprises a post portion having a cross-sectional dimension exceeding that of the multiplicty of holes and a threaded shaft attached to the post portion and dimensioned to extend through each of the multiplicity of holes and in which the associated stop member securing means comprise a nut which threads onto the shaft.

13. A valve as claimed in claim 10 in which the surface-defining member is integrallty connected to the housing.

14. A valve as claimed in claim 13 adapted to be operated alternatively by means of the handle or by means of an automatic actuator, the surface-defining member being formed with an additional set of open-ended holes of predetermined size and spaced-apart in a predetermined orientation such that the automatic actuator can be secured with threaded fasteners to the surface in engagement with the valve stem end portion.

15. A valve as claimed in claim 10 in which the means associated with the valve stem end portion for orienting the handle comprise a pair of flat parallel surfaces formed on the valve stem end portion and oriented substantially parallel to the general plane of the valve member

* * * * *